United States Patent
Marcatili

[15] 3,659,916
[45] May 2, 1972

[54] SINGLE-MODE DIELECTRIC WAVEGUIDE

[72] Inventor: Enrique Alfredo José Marcatili, Rumson, N.J.

[73] Assignee: Bell Telephone Laboratories, Incorporated, Murray Hill, N.J.

[22] Filed: July 28, 1970

[21] Appl. No.: 59,014

Related U.S. Application Data

[63] Continuation-in-part of Ser. No. 730,192, May 17, 1968, abandoned.

[52] U.S. Cl. .................................................350/96 WG
[51] Int. Cl. .................................H01p 3/00, G02b 5/14
[58] Field of Search..........................................350/96 WG

[56] References Cited

UNITED STATES PATENTS

| | | | |
|---|---|---|---|
| 3,563,630 | 2/1971 | Anderson et al. | 350/96 WG |
| 3,350,654 | 10/1967 | Snitzer | 350/96 WG UX |
| 2,794,959 | 6/1957 | Fox | 350/96 WG UX |
| 3,386,787 | 6/1968 | Kaplan | 350/96 WG |

OTHER PUBLICATIONS

Schineller " Single-Mode-Guide Laser Components" Microwaves Vol. 7, No. 1, Jan. 1968, pp. 77–85.

*Primary Examiner*—John K. Corbin
*Attorney*—R. J. Guenther and Arthur J. Torsiglieri

[57] ABSTRACT

This application describes a single-mode dielectric waveguide for guiding electromagnetic wave energy. The guide comprises a low-loss dielectric substrate in which a thin, low-loss, dielectric strip of higher refractive index is embedded. In general, such a guide is capable of supporting a plurality of modes of two orthogonally-polarized families of modes. To limit the waveguide to single-mode operation, the cross-sectional dimensions are limited so that the guide is incapable of supporting modes higher than the fundamental mode of each of the two families of modes. One of two fundamental modes is then supported by either placing a lossy material along one surface of the guiding strip, thereby making the guide much lossier to one of the two fundamental modes or, alternatively, by placing a higher refractive index material along the strip, thereby destroying the guiding capability of the waveguide with respect to one of the two fundamental modes.

5 Claims, 11 Drawing Figures

Patented May 2, 1972
3,659,916
3 Sheets-Sheet 1
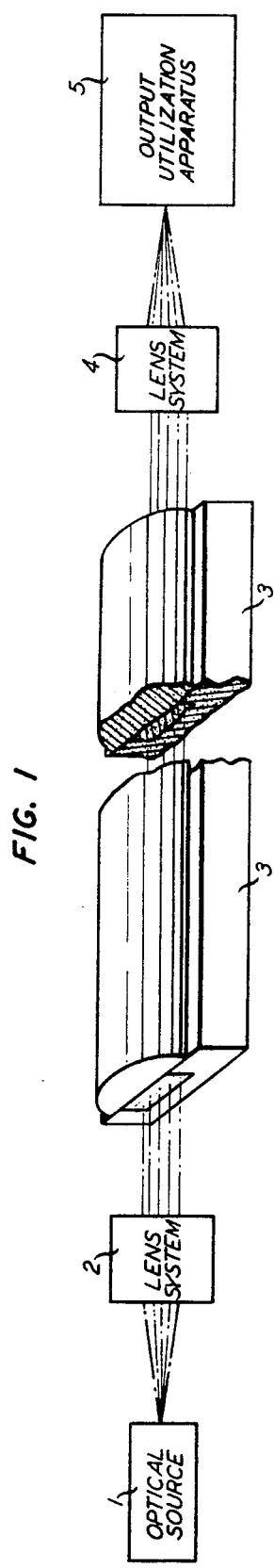
FIG. I
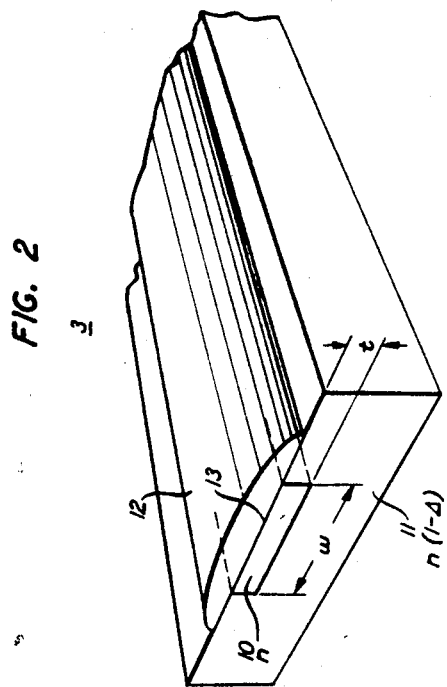
FIG. 2
INVENTOR
E. A. J. MARCATILI
BY
ATTORNEY

SINGLE-MODE DIELECTRIC WAVEGUIDE

This invention, which relates to single-mode dielectric waveguides, is a continuation-in-part of my copending application Ser. No. 730,192, filed May 17, 1968, now abandoned.

BACKGROUND OF THE INVENTION

In the transmission of electromagnetic wave energy through a hollow conductive pipe or other type of waveguide, it is well known that the energy can propagate in one or more transmission modes, or characteristic field configurations, depending upon the cross-sectional size and shape of the particular guide, and upon the operating frequency. Typically, at any given frequency, the larger the guide size the greater are the number of modes in which the energy can propagate. Normally, it is desired to confine propagation to one particular mode chosen because its propagation characteristics are favorable for the particular application involved, and because propagation in more than one mode gives rise to power loss, conversion-reconversion distortion and other deleterious effects.

If the desired mode happens to be the so-called dominant mode, and the wavelength of the wave energy is large enough, it is feasible to restrict the cross-sectional dimensions of the guide so that no modes other than the dominant mode can be sustained therein. This expedient is not applicable, however, if the desired mode is not the dominant mode, or if a guide of larger cross section is prescribed in order to minimize attenuation or for other reasons. These oversized, or multimode waveguides, are inherently capable of propagating more than one mode and, as such, are potentially troublesome. In these instances it becomes necessary to go to more complicated waveguiding structures such as, for example, the helical waveguide.

The advent of the optical maser as a source of coherent radiation at optical wavelengths has substantially magnified the problems of guiding electromagnetic wave energy. Because of the extremely small wavelengths involved, none of the techniques considered above have heretofore provided a practical means of obtaining efficient transmission.

In an article entitled "Optical Waveguide of Macroscopic Dimensions in Single Mode Operation" by R. A. Kaplan, published in the Aug. 1963 issue of the *Proceedings of the Institute of Electrical and Electronic Engineers* and, more recently, in an article by E. R. Schineller entitled "Single-Mode-Guide Laser Components," published in the Jan. 1968 issue of *Microwaves*, it is suggested that a dielectric waveguide, having a particular thickness, will limit propagation to the fundamental mode. In particular, the structure disclosed comprises a dielectric core embedded in a transparent dielectric medium of slightly lower dielectric constant. The core is typically a thin slab of prescribed thickness, but of undefined width.

Further study of this type of waveguide, however, has revealed that the mode-supporting properties of such a structure are more complex than that suggested in the above-identified articles.

SUMMARY OF THE INVENTION

The present invention is based upon the recognition that a dielectric waveguide is capable of supporting pairs of orthogonally-polarized families of modes. Thus, if a dielectric waveguide is to be truly supportive of only a single propagating mode, both transverse dimensions must be defined within specified limits.

In accordance with the present invention, single-mode propagation along a dielectric waveguide comprising a guiding strip of essentially rectangular cross section, is achieved by selecting both transverse dimensions of the dielectric guiding strip so as to limit guidance to no higher than the fundamental mode of each of the two orthogonally-polarized family of modes, and including means for either attenuating or preventing guidance of one of the two fundamental modes. In one embodiment of the invention, to be described in greater detail hereinbelow, the waveguide is made very much lossier to one of the two orthogonally-polarized fundamental modes by placing a lossy material, of lower refractive index than the strip, along one surface of the guiding strip. In a second embodiment of the invention, all the modes in the family of modes to be suppressed are made evanescent by locating a higher refractive index material along one side of the guiding strip.

One of the principal advantages of the present invention resides in the fact that it is a physically realizable structure. The importance of this is illustrated by reference to U.S. Pat. No. 3,386,787, which also shows a form of mode-limited waveguide comprising two, coaxial dielectric cylinders, bisected by means of a conductive surface. In such a waveguide, however, the ratio of the cross-sectional dimensions of the guiding strip is fixed at two-to-one; and while such a waveguiding structure is theoretically capable of single-mode operation, there are practical difficulties associated with its construction. For example, the invention contemplates fabricating dielectric waveguides by diffusing an impurity into a substrate, using a masking process, to form a thin, film-like guiding strip. The depth $t$ of the diffusion would typically be a few tenths of a micron, and can be readily controlled by well-known techniques. However, it is beyond the state of the art to make a mask having an opening whose width is comparable to $t$ since the irregularities along the edges of the mask opening would themselves be comparable to the $t$ dimension. As a practical matter, the width $w$ of the guiding strip, as contemplated by the present invention, will, typically, be larger than $2t$. Specifically, widths of the order of four or more times greater than $t$ appear useful.

Thus, it can be anticipated that a guide configuration which limits the strip width to twice the strip thickness will be very lossy for the reasons noted. By contrast, the present invention discloses a dielectric waveguide comprising a guiding strip having an essentially rectangular cross-sectional configuration which is limited to single-mode propagation over an infinite range of width-to-thickness ratios.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 1 shows an optical system including a dielectric waveguide;

FIG. 2 shows a first embodiment of a dielectric waveguide in accordance with the invention;

DETAILED DESCRIPTION

Figure 3A:
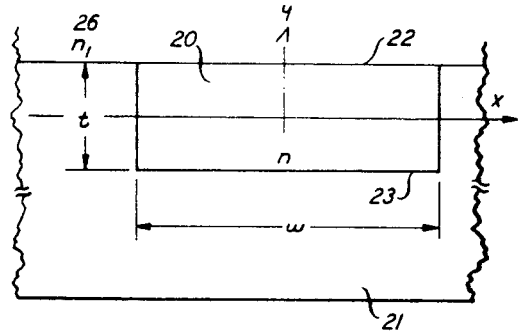
FIGS. 3A through 3G, included for purposes of explanation, show a dielectric waveguide and the electric field configurations along two mutually perpendicular directions transverse to the direction of wave propagation.

While, in principle, the invention can be used to guide electromagnetic wave energy at any frequency, the following discussion is directed specifically to the guidance of optical wave energy including wave energy in the infrared, the visible and the ultraviolet portions of the frequency spectrum. In this connection, FIG. 1 shows an optical system including a source 1 of optical wave energy, and a lens system 2 for focusing and directing the wave energy emitted from source 1 onto one end of a dielectric waveguide 3 of the type to be described in greater detail hereinbelow.

At the output end of waveguide 3, a second lens system 4 directs and focuses the wave energy from guide 3 into some form of output utilization apparatus 5.

FIG. 2 shows dielectric waveguide 3, in accordance with the present invention, comprising a transparent (low-loss) dielectric strip 10, of refractive index $n$, embedded in a second transparent dielectric material 11, such as glass, of slightly lower refractive index $n(1-\Delta)$.

While the permissible cross-sectional dimensions of strip 10 will be defined in greater detail hereinbelow, it is contemplated, in accordance with the present invention, that strip 10 is a thin film or ribbon-like member whose thickness $t$ is much less than its width $w$. Typically, a preferred width-to-thickness ratio is of the order of 4 to 1 or greater.

Disposed along the exposed (upper) side of strip 11, and in contact therewith, is a layer of a third material 12 whose properties will be discussed in greater detail hereinbelow.

For purposes of illustration, and to simplify the mathematical calculations, strip 10 is shown to have a precisely rectangular cross section. This, however, is not at all essential to the operation of the invention, nor is it very likely to be so. In general, while the cross-sectional configuration of strip 10 is essentially rectangular, its exact configuration will depend upon the particular manufacturing process employed. Typically, the edges of the strip will either be rounded off, causing the cross section of the guiding strip to assume a more elliptical shape, or the edges will be irregular. In addition, the refractive index, typically, will not change abruptly but, rather, will taper from one value in one dielectric material to a second value in an adjacent material. Notwithstanding these departures from the idealized configuration, the operation of the waveguide is in accordance with the principles to be considered, and the actual strip dimensions are essentially, if not exactly, as defined hereinbelow.

Before proceeding with a discussion of the invention, some general comments about the field distribution in a dielectric waveguide, comprising dissimilar dielectric materials, would appear to be helpful. Accordingly, FIG. 3A through FIG. 3G are included for purposes of explanation. Specifically, FIG. 3A shows the cross section of a dielectric waveguide comprising, as in FIG. 2, a guiding strip 20 embedded in a substrate 21 of slightly lower dielectric constant. For purposes of the following discussion, the upper surface of strip 20 is depicted as in contact with a material 26 whose refractive index $N_1$ is lower than that of strip 20 and substrate 21. As an example, material 26 can be air for which $n_1 = 1$.

In general, the modes that propagate along strip 20 are characterized by electric and magnetic field distributions that include components along the direction of propagation and along two mutually-perpendicular directions transverse to the direction of propagation. However, since the axial components are very much smaller than the transverse components, the former are neglected in the discussion that follows, and only the transverse components are referred to. Thus, the modes may be conveniently divided into two families whose electric fields are polarized along two mutually-perpendicular directions transverse to the direction of wave propagation. In FIG. 3A, one of these directions, normal to the strip-air interface 22, is designated the $y$ direction, and the other direction, parallel to the strip-air interface is designated the $x$ direction.

Figure 3F:
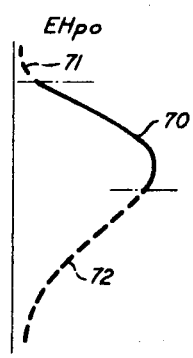
Figure 3G:
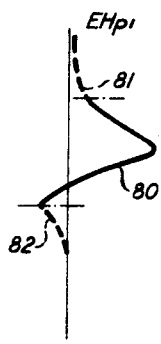
Figure 3B:
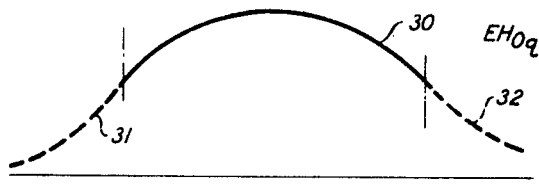
Figure 3C:
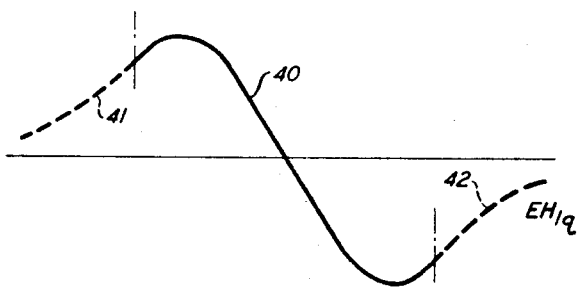
Figure 3D:
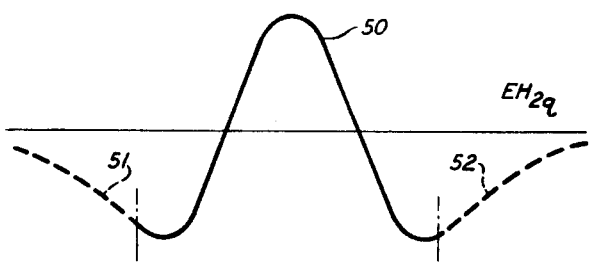
Figure 3E:
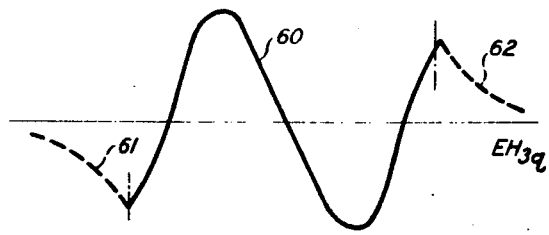

FIGS. 3B through 3D depict, qualitatively, the electric field distributions of the three lowest order propagating modes for both families of modes that can be supported by a guiding strip of width $w$. FIG. 3E shows a higher order mode which, for purposes of illustration, is shown as an evanescent, or nonguided mode.

Basically, each of the modes for both families of orthogonally-polarized modes, is characterized by a sinusoidal varying field distribution within guiding strip 20 along both the $x$ and $y$ directions, and by exponentially decreasing field distributions in substrate 21 and in the surrounding air. Thus, referring more specifically to FIG. 3B, the lowest order $EH_{oo}$ mode is characterized by a sinusoidally varying field distribution 30 within strip 20 in the $x$ direction of less than one-half guide wavelength, where a guide wavelength, $\lambda_x$, for the $0^{th}$ order mode in the $x$ direction is given by $$\lambda_x = 2w\left[1 + \frac{\lambda}{\pi w n \sqrt{2\Delta}}\right] \quad (1)$$

and by exponentially decreasing field distributions 31 and 32 in substrate 21. Because of the symmetry of the structure about the $y$ direction axis, the amplitude of the field distribution is symmetrical with respect to the guide center.

The field distribution in the $y$ direction, shown in FIG. 3F, (where $q = 0$) is similar to the field distribution in the $x$ direction in that it includes a sinusoidally varying region 70 and exponential regions 71 and 72. However, because the dielectric materials above and below guide strip 20 are different, the field distribution in the $y$ direction is not symmetric with respect to the center of strip 20. Instead, there is a displacement towards the higher dielectric material which, in FIG. 3A, is the material of substrate 21. This is clearly indicated in FIG. 3F which shows the peak amplitude of the sinusoidal portion of the field distribution 70 displaced towards the guide-substrate interface 23 and, correspondingly, displaced away from the guide-air interface 22. The exponentially decreasing portions 71 and 72 of the field distribution are correspondingly dissimilar, with a larger proportion of the electromagnetic wave energy being distributed in the substrate, and less in the air.

In order for any mode to be guided, guide strip 20 must be capable of supporting the field distributions for that particular mode along both the $x$ and $y$ directions. Assuming materials of equal magnetic permeability, such support is realized when both the slopes (first derivatives) and the amplitudes of the sinusoidal and exponential magnetic fields are equal at the interfaces between the guiding strip 20 and the surrounding materials. This is clearly the case for each of the field distributions illustrated in FIGS. 3B and 3F and, hence, the fundamental $EH_{oo}$ mode for both families of orthogonally-polarized modes is capable of being guided by and propagates along strip 20.

A similar situation is depicted for the next two higher order modes ($EH_{1q}$ and $EH_{2q}$) illustrated in FIGS. 3C and 3D. In each instance, a sinusoidally varying field distribution (40 and 50) within strip 20 meets the exponential field distributions (41, 42 and 51, 52), respectively, with the proper amplitude and slope.

In like fashion, the order of the modes that can be supported along the $y$ direction is limited by the thickness, $t$, of the guiding strip. For purposes of illustration, the guiding strip is assumed to be too thin to support any higher order modes. Hence, the next higher order mode ($EH_{p1}$) along the $y$ direction, illustrated in FIG. 3G, is shown to be discontinuous at interface 23 and, hence, unguided. Thus, for purposes of explanation, each of the guided modes $EH_{oo}$, $EH_{1q}$ and $EH_{2q}$ are characterized by a field distribution along the $x$ direction as shown in FIGS. 3B, 3C and 3D, and a field distribution along the $y$ direction as shown in FIG. 3F, in which case $q = 0$.

For the $EH_{3q}$ mode, illustrated in FIG. 3E, the guiding strip 20 is too narrow, and a rising field distribution 61 and 62 at each interface 22 and 23 makes it impossible to satisfy the equal slope requirements of a guided mode. As a result, energy coupled into the $EH_{3q}$ mode, or any higher order mode, is not guided along strip 20, but tends to spread throughout the substrate. Such a mode is referred to as an unguided mode.

From the above discussion it is evident that for a mode to be guided, the guiding strip must be large enough to support the necessary field distribution along two mutually perpendicular transverse directions. This further means that at the very least, the guide will support the fundamental mode for each of the two orthogonally-polarized families of modes. Hence, in the absence of any special precautions, a dielectric waveguide cannot be a single mode waveguide. The higher order modes, however, can readily be suppressed by restricting the cross-sectional dimensions of the guiding strip. In particular, to limit the waveguide to the fundamental modes, the width, $w$, and the thickness, $t$, of the guiding strip for the above-described waveguide, are such that:

$$0 < w \leq \frac{\lambda}{2n\sqrt{2\Delta}} \qquad (2)$$

$$\frac{\pi + \tan^{-1}\left(\frac{n}{n_1}\right)^2 \sqrt{\frac{n^2 - n_1^2}{2\Delta n^2} - 1}}{\frac{2\pi n}{\lambda}\sqrt{2\Delta}} \geq t \geq \frac{\tan^{-1}\left(\frac{n}{n^1}\right)^2 \sqrt{\frac{n^2 - n_1^2}{2\Delta n^2} - 1}}{\frac{2\pi n}{\lambda}\sqrt{2\Delta}} \qquad (3)$$

It will be noted, from equation (2), that there is no theoretical lower limit to the width of the guide strip. This is so because of the symmetry of the field distribution, as shown in FIG. 3B, which makes it always possible to equate the slopes of the sinusoidal and exponential magnetic fields at the interfaces for any width strip. The thickness of the guiding strip, on the other hand, is influenced by the fact that the field distribution is not symmetrical and, if made less than that given by equation (3), will not satisfy the field conditions at interface 23.

If, however, the refractive index $n_1$ of material 26 is approximately equal to the refractive index $n(1-\Delta)$ of the substrate 43, equation (3) also reduces to $$\frac{\lambda}{2n\sqrt{2\Delta}} \geq t > 0 \qquad (4)$$

Having defined the guide strip size so as to support only the two orthogonally-polarized fundamental modes, means are now provided to suppress one of these two modes and, thereby, to realize single mode propagation. In particular, there are two possible approaches that can be employed, as are now described.

1. Lossy dielectric material with refractive index $|n_1| < |n|$.

In accordance with this first embodiment of the invention, a layer of lossy material is placed in contact with one of the surfaces of the guiding strip. Thus, for this embodiment, layer 12 in FIG. 2 is a material that is lossy over the frequency of interest. For the mode whose electric field is primarily directed normal to interface 13, between strip 10 and lossy material 12, the energy loss due to the presence of layer 12 is relatively small. However, for the mode that is primarily polarized parallel to interface 13, the loss is significant, and that mode is more heavily attenuated. This arrangement is similar to the helical waveguide, as used as millimeter wave frequencies, wherein the TM modes are more highly attenuated by the lossy jacket surrounding the helical structure than is the desired circular electric mode wave.

It is recognized that the term "lossy" is a relative term and, hence, some standard against which loss is measured must be established. Since, as indicated above, both modes are attenuated by the lossy layer, the level of loss to be introduced is preferably measured by the effect upon the desired mode, rather than by the effect upon the mode to be eliminated. As a practical matter, a doubling of the attenuation constant of the desired mode would appear to be acceptable. However, a greater or smaller change in the attenuation constant may be decided upon, depending upon the particular application. In any case, the undesired mode, by experiencing a much higher level of attenuation, is, for all practical purposes, suppressed.

It should be noted that in this arrangement, both orthogonal modes are supported by, and propagated along the guide. The strip dimensions are defined within the limits given by equations (2) and (3).

Lossy strip 12 is conveniently made of the same material as substrate 11, additionally doped with some metallic ions, such as cobalt or iron, to realize the desired level of attenuation.

2. Higher admittance material with $|n_1| > |n|$.

In accordance with a second embodiment of the invention, single-mode operation is realized by placing a high admittance material, having a larger refractive index than the guiding strip, along one of the surfaces of the strip.

Since the admittance $Y$ of a material is given by $$Y = \sqrt{\frac{g + i\omega\epsilon}{i\omega\mu}} \qquad (5)$$

where
  $g$ is its conductance,
  $\epsilon$ is its dielectric constant,
  $\omega$ is the angular frequency,
and
  $\mu$ is its permeability, a high admittance can be realized by either a high conductance or a high dielectric constant. In many materials, at optical frequencies, these parameters become complex and vary as a function of frequency. However, so long as the absolute value of their refractive index, $|n_1|$, is larger than that of the guiding strip, where $$n_1 = \sqrt{\frac{g + i\omega\epsilon}{i\omega\epsilon_0}} \qquad (6)$$

and $\epsilon_0$ is the dielectric constant of free space, the desired mode suppression is realized.

It should be noted, in this connection, that by "large" is meant two, three or more times greater than the refractive index of the guiding strip. That is, the absolute value $|n_1|$ of the refractive index of the material of layer 12 is equal to or greater than $|2n|$. However, as will be explained in greater detail hereinbelow, larger refractive indices are to be preferred. Thus, this material can either be a metal, or a semiconductor material such as intrinsic gallium arsenide.

Figure 4:
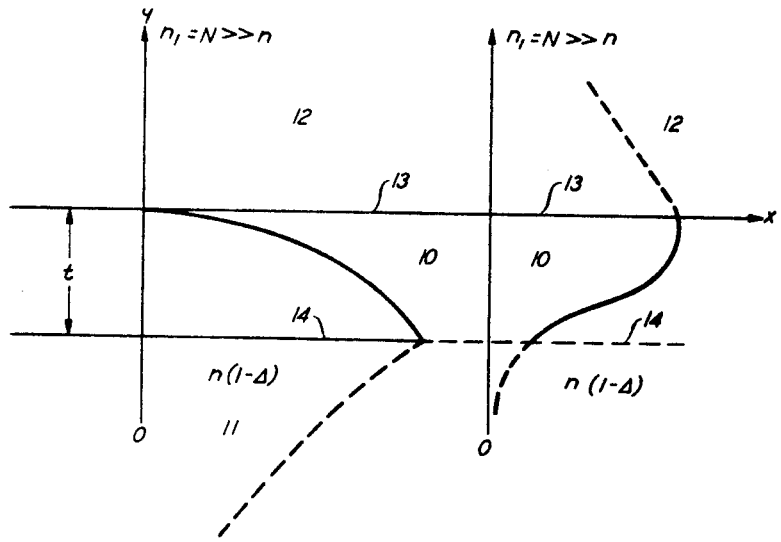
FIG. 4 shows the effect upon the field configuration produced by placing a high admittance material adjacent to one side of the waveguide strip.

The effect of locating a high admittance material along the guiding strip is to alter the field distributions along the $y$ direction for the two differently-polarized modes in a manner which renders the undesired mode unguided, while the desired mode remains a guided mode. This is illustrated in FIG. 4 which shows the electric field distributions along the $y$ direction for the $x$ and $y$-polarized modes. When the admittance of layer 12 is much larger than that of the guiding strip, the electric field intensity for the $x$-polarized mode is essentially zero at interface 13. It increases sinusoidally and, with the strip thickness less than a quarter of a guide wavelength, where a guide wavelength, $\lambda_y$, in the $y$ direction is given essentially by $$\frac{\lambda}{n\sqrt{2\Delta}}, \qquad (7)$$

the field intensity is rising and reaches a maximum at interface 14. Since the slope of the field within strip 10 is increasing while the slope in substrate 11 is decreasing, the equal slope conditions cannot be satisfied at interface 14, and the mode becomes unguided.

For the $y$-polarized mode, however, the electric field is close to a maximum at interface 13, increases to a maximum within the guide strip, and then decreases to a lower value at interface 13. For the limiting case where $n_1 = \infty$, the field is a maximum at interface 13. However, in all cases the equal slope condition can be satisfied at both interfaces and the $y$-polarized wave remains a guided wave.

The attenuation per unit length for the $y$-polarized wave is given by:

$$\alpha = \left[\frac{4\pi\Delta n}{\lambda}\right]\left[Im\left(\frac{2\pi n t\sqrt{2\Delta}}{\lambda} - \frac{in}{n_1\sqrt{2\Delta}}\right)^2\right] \qquad (8)$$

where
  $Im$ refers to the imaginary part of the expression within the parenthesis.

From equation (8) it is seen that the attenuation of the preferred mode decreases as $n_1$ increases. Thus, the material used in layer 12, advantageously, has a very large admittance at the frequency of interest. As an example, a metal, whose admittance at the frequency of interest is one order of magnitude greater than that of the waveguide, is advantageously used.

In the embodiment of FIG. 2 guiding strip 10 is partially embedded in a substrate 11 of uniform refractive index $n(1-\Delta)$. However, since the transverse dimensions $w$ and $t$ of the guiding strip depend upon the difference in refractive index between the strip and the surrounding media, a greater range of strip aspect ratios can be realized by means of the arrangement illustrated in FIG. 5 wherein the substrate material 40 and 41 along the $t$ dimension of the strip 42 is not the same as the materials 43 and 44 along the $w$ dimensions of strip 42.

Figure 5:
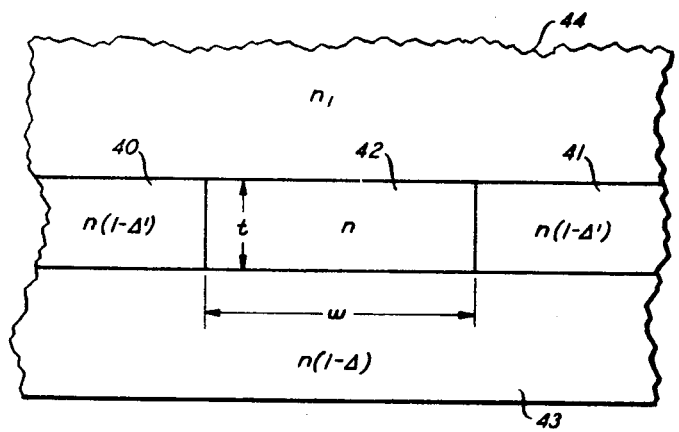
FIG. 5 shows an alternate embodiment of the invention wherein the refractive index of the substrate material in contact with the guiding strip is not the same along all sides.

An important advantage of the embodiment of FIG. 5 is that it permits a greater range of width-to-thickness ratios than can be realized with a uniform substrate. That is, wider strips supportive of only the fundamental mode of propagation can be made by using a refractive index material along the narrow sides of the strip such that $\Delta' < \Delta$.

While the invention has been described with particular reference to the propagation of electromagnetic wave energy in the optical range, it is understood that the dielectric waveguide described herein can also be used to guide wave energy in the microwave and millimeter wave portions of the spectrum. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. A waveguide for guiding electromagnetic wave energy comprising:

an elongated, low-loss dielectric guiding strip, having a refractive index $n$ and an essentially rectangular cross section, embedded in a low-loss dielectric substrate of lower refractive index;

said substrate contacting the two narrow surfaces and one of the wide surfaces of said strip;

and a high admittance material having a refractive index whose magnitude is larger than the refractive index of said strip contacting the other wide surface of said strip; characterized in that:

the narrow dimension $t$ and the wide dimension $w$ of said strip are given by $$\frac{\lambda}{2n} < t < \frac{\lambda}{2n\sqrt{2\Delta}},$$

and $$2t < w < \frac{\lambda}{2n\sqrt{2\Delta'}},$$

where the refractive index of the portion of substrate in contact with said narrow surfaces is $n(1-\Delta')$, the refractive index of the portion of substrate in contact with said one wide surface is $n(1-\Delta)$, and $\lambda$ is the free space wavelength of said wave energy.

2. The waveguide according to claim 1 wherein $\Delta'$ is smaller than $\Delta$.

3. The waveguide according to claim 1 wherein $\Delta' = \Delta$.

4. The waveguide according to claim 1 wherein said material is a metal.

5. The waveguide according to claim 1 wherein said material is a semiconductor

* * * * *

UNITED STATES PATENT OFFICE
CERTIFICATE OF CORRECTION

Patent No. 3,659,916           Dated May 2, 1972

Inventor(s) Enrique A. J. Marcatili

It is certified that error appears in the above-identified patent and that said Letters Patent are hereby corrected as shown below:

Col. 4, line 52, change "$EH_{29}$" to --$EH_{2q}$--.

Col. 8, line 13, change "$\frac{\lambda}{2n} < t < \frac{\lambda}{2n\sqrt{2\Delta}}$," to $$--\frac{\lambda}{2n} < t < \frac{\lambda}{4n\sqrt{2\Delta}},--.$$

At the end of claim 5 put a period.

Signed and sealed this 28th day of November 1972.

(SEAL)
Attest:

EDWARD M. FLETCHER, JR.
Attesting Officer

ROBERT GOTTSCHALK
Commissioner of Patents